T. K. GRIFFITH.
APPARATUS FOR RAKING AND BINDING GRAIN.
No. 106,357.  Patented Aug. 16, 1870.
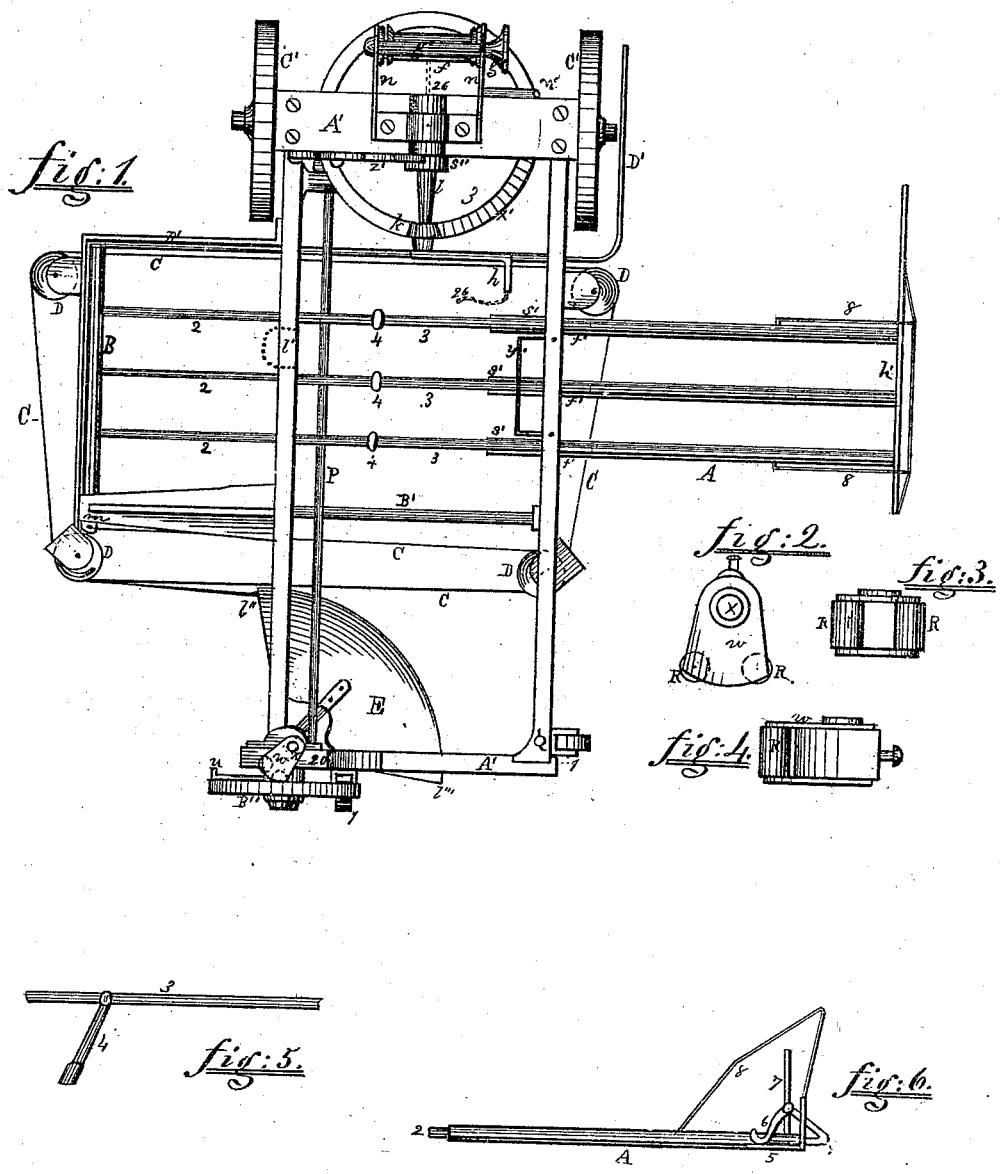

T. K. GRIFFITH.
APPARATUS FOR RAKING AND BINDING GRAIN.
No. 106,357.
Patented Aug. 16, 1870.
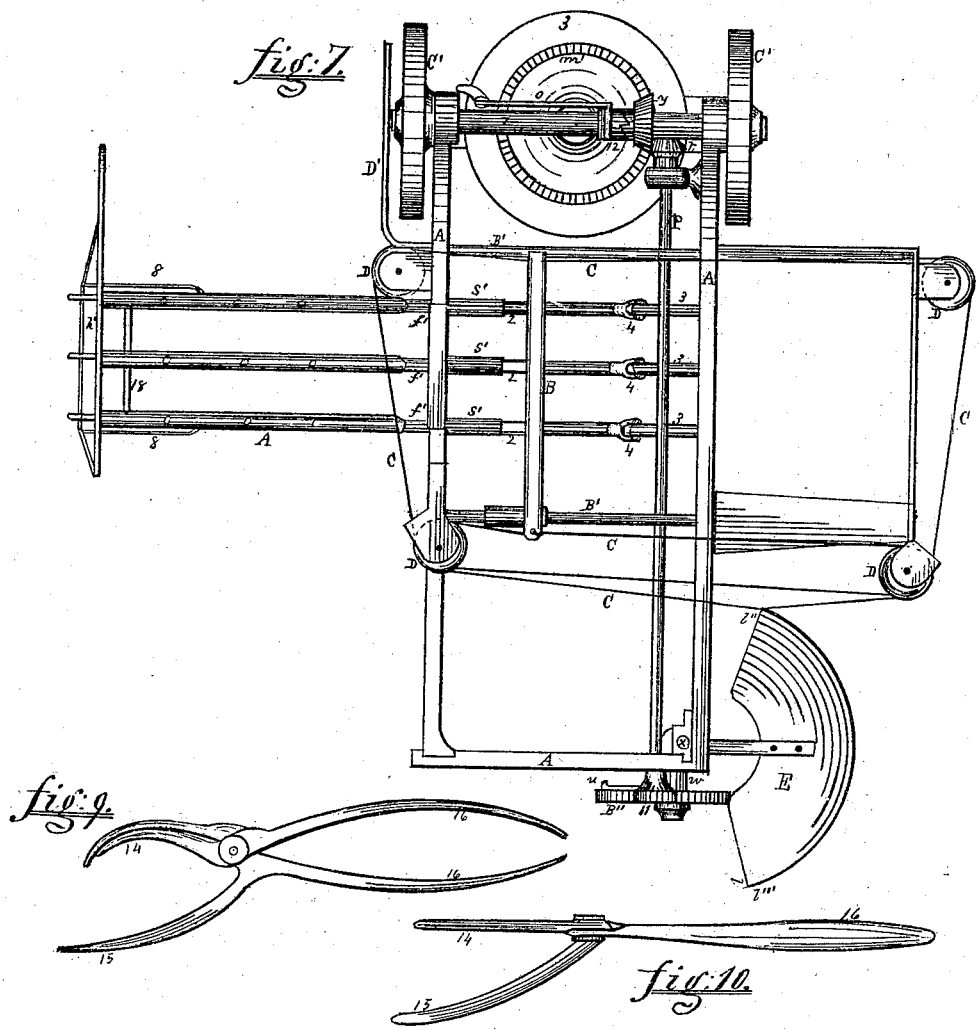
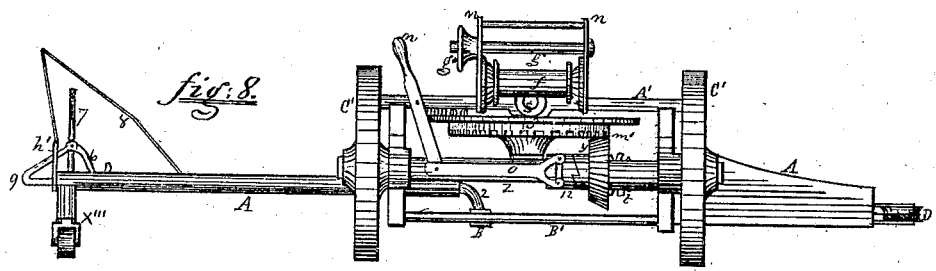

United States Patent Office.

THOMAS K. GRIFFITH, OF REDSTONE, PENNSYLVANIA.

Letters Patent No. 106,357, dated August 16, 1870; antedated August 4, 1870.

IMPROVEMENT IN APPARATUS FOR RAKING AND BINDING GRAIN.

The Schedule referred to in these Letters Patent and making part of the same

*To all whom it may concern:*

Be it known that I, THOMAS K. GRIFFITH, of Redstone, in the county of Fayette and State of Pennsylvania, have invented a new and useful Improvement in Machines for Raking and Binding Grain; and I do hereby declare that the following is a full, clear, and exact description thereof, reference being had to the accompanying drawing, and to the letters and figures of reference marked thereon.

The nature of my invention consists in constructing a machine for raking and binding grain by the combination and arrangement of the parts hereinafter described.

To enable others skilled in the art to make and use my invention, I will proceed to describe more fully its construction and operation.

In the accompanying drawing which forms part of my specification—

Figure 1, sheet A, is a top view or plan of my improvement in machines for raking and binding grain.

Figure 2 is a top view of a shifting piece used in connection with other mechanism for imparting a reciprocating motion to the rake.

Figure 3 is an end elevation of the same.

Figure 4 is a side elevation of the same.

Figure 5 is a section of the rod or bar, to which is attached a pendant, against which is gathered the grain for binding.

Figure 6 is a side elevation of a section of the gathering-platform and rake.

Figure 7, sheet B, represents the raking-and-binding machine when it is inverted.

Figure 8 is an end elevation of the machine.

Figure 9 is a side view of a pair of pinchers, used for the purpose of looping and cutting the cord used in binding.

Figure 10 is an edge view of the same.

In the accompanying drawing—

A' represents the frame of the machine, and may be constructed of wood or metal.

C represents the front or driving-wheels of the machine.

The back end of the frame A' is supported on small wheels 1, better known as casters.

To the frame A' is pivoted the gathering-platform A, which consists of three grooved bars, pivoted at *f*, and connected at their outer ends to an end piece, *h'*, to the two outside bars, and this end piece are attached inclined rods 8.

The rake consists of the head-piece B, which moves on slides B', and of three rods marked 2, which are attached to the head-piece B; the outer of the rods 2 are bent back at an obtuse angle to the longitudinal plane of the rods 2, as shown at 9, and just back of these angle ends are arranged the rake-teeth 7, which are pivoted to the rods 2, as shown in figs. 6 and 8.

The outer end of the gathering-platform A is supported by a caster-wheel, $x'''$, clearly shown in fig. 8.

The rods 2 of the rake move in the grooved bars of the gathering-platform A, and in guides S', which are attached to one side of the frame A', and on a line with the grooved bars of the gathering-platform.

Three bars, marked 3, are placed across the upper side of the frame A', directly over the line of travel of the bars 2 of the rake, and from the bars 3, projecting downward, are arms or pendants marked 4, the lower ends of which are notched out, so as to straddle the bars 2 of the rake.

At one corner, and at the back end of the frame A', is pivoted, in suitable bearings, a shaft, $x$, to the lower end of which is attached a sector, E, to which, at $l''$ and $l'''$, are attached the cords C, which pass around in grooves in the outer edge of the sector, and around the pulleys D, and are connected to the head-piece B of the rake.

On the shaft $x$ are two shifting pieces, $w$, provided with rollers R, the form and arrangement of which are shown in figs. 1, 2, 3, and 4. These pieces $w$ are arranged on the shaft $x$ in different positions with relation to each other, so that they will cause the shaft $x$ to rotate one-fourth of a revolution, giving to it a reciprocating motion, by the projecting points $u$ coming in contact with the rollers R in the piece $w$ on the upper end of the shaft $x$, and then, by coming in contact with the rollers of the piece $w$, placed on the shaft $x$ below the upper piece $w$, so that the distance from the lower side of one piece to the upper side of the other piece shall be equal to the diameter of the wheel B'', which is pivoted to the bearing 20 of the shaft $x$.

The wheel B'' gears into a small wheel on the end of shaft P. On the opposite end of this shaft is also secured a small wheel, $t$, which gears into the wheel $y$, which revolves on axle $z$, to which the driving-wheels C' are permanently attached.

On the axle $z$ is placed a coupling, 12, which is fitted to the hub of the wheel $y$, and is slipped into and out of gear with the wheel $y$ by means of the rod C, which is operated by the lever $u'$, clearly shown in fig. 8.

The wheel $y$ gears into the teeth $m'$ on the under side of the wheel 3, which is pivoted to the under side of the front end piece of the frame A'.

On the upper side of the wheel 3 are teeth $x'$, which gear into the wheel $k$ on the shaft $l$, on the inner end of which is placed the winding-arm $h$.

The shaft $l$ is provided with a ratchet-wheel, $s''$, which, in connection with the pawl and spring $z'$, is used for holding the shaft $l$ and its winding-arm $h$ in a fixed position, after being rotated through the medium of the wheel $k$ and teeth $m'$ on the upper face of wheel 3. The shaft $l$ has its bearings in the upper side of the front end piece of the frame $A'$, and is hollow, as shown at $s$ in fig. 8.

The frame or support $n$ for the drum $f$ is secured on the front end piece of the frame $A'$, and is so constructed that it will yield to the action of the tension-nut $g'$ on the end of the rod $g$, and thereby bind the support $n$ against the ends of the drum $f$, so as to prevent it from turning too rapidly while drawing off the binding-cord during the operation of binding the grain.

As the skilful mechanic will readily understand, the construction and arrangement of the machine and its several parts, and the relation that the different parts bear to each other, I will therefore proceed to describe the operation.

Having the hereinbefore-described raking-and-binding machine attached to a reaping-machine, so that the gathering-platform A will be directly back of the cutting device of the reaping-machine, and having on the drum $f$ a suitable supply of cord for binding, with the outer end of the cord passed through the hollow shaft $l$ and the winding-arm $h$, the operator being provided with pinchers, such as shown in figs. 9 and 10, in which 16 represents the handles, 15, the cutter, and 14 the nippers, the operator takes his seat (indicated by dotted lines $l'$) and takes hold of the cord, (indicated by the dotted lines 26.) Now, the forward motion of the reaping-machine will cause the wheels $C'$ and their axle $z$ to revolve, and by shipping, through the medium of lever $n'$ and bar $o$, the coupling 12 into gear with the hub of the wheel $y$, it will be revolved, which will revolve wheels 3 and $t$, and the revolving of wheel $t$ will revolve the shaft P, which will revolve the wheel 11, which will revolve the wheel $B''$, which will bring the projections $u$ up against the rollers R in the piece $w$, which will rotate the shaft $x$ one-fourth of a revolution, which will turn the sector E into the position represented in fig. 7, which movement of the sector will, through the medium of cords C, force the rake back until its teeth 7 assume a vertical position with relation to the gathering-platform A, as shown in fig. 8. The teeth 7 of the rake are thrown into a vertical position by trigger 6 coming in contact with the piece 5 on the side of the gathering-platform, (see fig. 6.)

The wheel $B''$, continuing to revolve will carry the projecting pieces $u$ down against rollers R in the lower piece $w$, and thereby turn the shaft $x$ back one-fourth of a revolution, which will throw the sector E into the position shown in fig. 1, which will, through the medium of the cords C, cause the rake to gather the grain which has fallen on the platform A up into a bundle, and against the pendants 4; at this point the teeth $x'$ will gear into wheel $k$, and give the shaft $l$ about two revolutions, which will cause the winding-arm $h$ to wind the binding-cord twice around the bundle of gathered grain. The operator then, with the pincher hereinbefore described, takes hold of the cord with the nippers 14 of the pinchers, and forces the end of the cord which he held in his hand in under the cord wrapped around the bundle, and before he withdraws the points of the nippers from under the cord, which is around the bundle of grain, he gives the pinchers a twist, so as to cause the cutter 15 to cut the cord leading from the winding-arm $h$ to the bundle, the operator having hold of that portion of the cord next to the winding-arm $h$.

The rake, in moving back, for the purpose of gathering another bundle, will allow the bound bundle to drop down from the machine. Thus will the several parts as described continue to operate, gathering and binding one bundle after another, while the reaping-machine is in operation.

The angle form of the ends 9 of the bars 2 of the rake is for the purpose of allowing the bars to pass readily under the grain during the back motion of the rake, and the teeth 7 are pivoted, so that they will assume a horizontal position during the same motion of the rake. The inclined rods are used for throwing the grain forward on the gathering-platform, and to give room for the teeth of the rake to assume a vertical position.

The guide D' is used for the purpose of shaping and squaring the end of the bundle of grain during the forward movement of the rake and grain toward the pendants 4.

The piece $y'$ is for preventing the bundle from being carried back onto the gathering-platform.

Having thus described the nature, construction, and operation of my improvements,

What I claim is—

1. The gathering-platform A, combined with the rake, operated thrugh the medium of cords C, pulleys D, and a segment, E, having a reciprocating motion, said motion being imparted to the segment by means of shafts and gearing, the whole being constructed, arranged, and operating substantially in the manner herein described and for the purpose set forth.

2. The binding device, consisting of drum $f$, tension-shaft $g$, winding-arm $h$, operated through the medium of pinion $k$ on shaft $l$, and wheel 3, constructed, arranged, and operating substantially as herein described and for the purpose set forth.

THOMAS K. GRIFFITH.

Witnesses:
A. C. JOHNSTON,
JAS. G. THOMPSON.